United States Patent
Li

(10) Patent No.: US 12,398,742 B1
(45) Date of Patent: Aug. 26, 2025

(54) STORAGE POLE FACILITATING TELESCOPIC CONTROL ADJUSTMENT

(71) Applicant: Shenzhen Zhihui Youpin Technology Co., LTD, Shenzhen (CN)

(72) Inventor: Qipeng Li, Shenzhen (CN)

(73) Assignee: Shenzhen Zhihui Youpin Technology Co., LTD, Shenzhen (CN)

( * ) Notice: Subject to any disclaimer, the term of this patent is extended or adjusted under 35 U.S.C. 154(b) by 0 days.

(21) Appl. No.: 19/031,321

(22) Filed: Jan. 17, 2025

(51) Int. Cl.
   F16B 7/10  (2006.01)
   A47G 9/02  (2006.01)

(52) U.S. Cl.
   CPC ............ *F16B 7/105* (2013.01); *A47G 9/0215* (2013.01); *A47G 9/0223* (2013.01)

(58) Field of Classification Search
   CPC .. B60P 7/15; B60P 7/135; F16B 7/105; F16B 7/042; F16B 7/1418; F16B 7/1445; F16B 7/1454; F16B 7/1463; F16M 11/046; F16M 11/06; F16M 11/041; F16M 11/048; A47B 9/00
   See application file for complete search history.

(56) References Cited

U.S. PATENT DOCUMENTS

| | | | | |
|---|---|---|---|---|
| 2,819,033 A * | 1/1958 | Boyce | ............... | B64D 1/04 74/502 |
| 3,090,600 A * | 5/1963 | Smith | ............... | B60P 7/15 410/151 |
| 5,662,429 A * | 9/1997 | Battocchio | ........... | F16M 11/046 403/321 |
| 5,813,647 A * | 9/1998 | Chen | .................. | B60P 7/15 410/151 |
| 5,845,664 A * | 12/1998 | Ryder | .................. | A45B 3/04 135/65 |
| 6,006,477 A * | 12/1999 | Ko | ..................... | A45B 19/04 135/25.4 |
| 6,247,882 B1 * | 6/2001 | Huang | ................ | B60P 7/15 410/151 |
| 6,347,777 B1 * | 2/2002 | Webber | ............... | A47C 7/402 248/188.5 |
| 6,368,037 B1 * | 4/2002 | Oliviero | ............. | B60P 7/15 410/151 |

(Continued)

FOREIGN PATENT DOCUMENTS

| CN | 203828819 U | 9/2014 |
|---|---|---|
| CN | 212451994 U | 2/2021 |
| CN | 221266011 U | 7/2024 |

*Primary Examiner* — Daniel J Wiley
(74) *Attorney, Agent, or Firm* — Nitin Kaushik

(57) ABSTRACT

The present invention discloses a storage pole for facilitating telescopic control adjustment, comprising a main support pipe fitting, a fixed sleeve being installed at a front end of the main support pipe fitting, a limit adjustment mechanism being installed on a surface of an upper end of the fixed sleeve, and the limit adjustment mechanism being used for limiting and locking the telescopic adjustment pipe. According to the present invention, the limit adjustment mechanism facilitating assembling and fixing is installed at the front end of the main support pipe fitting, a limiting pin can be quickly controlled to be separated from a limit slot hole on the surface of the telescopic adjustment pipe by a pressing manner, thereby being capable of freely sliding the telescopic adjustment pipe to quickly adjust a length of the entire storage pole.

9 Claims, 8 Drawing Sheets

(56) References Cited

U.S. PATENT DOCUMENTS

| | | | | |
|---|---|---|---|---|
| 6,726,393 B2* | 4/2004 | Tsai | ............... | B25B 15/001 403/322.2 |
| 7,097,380 B2* | 8/2006 | Lee | ............... | F16B 7/105 15/80 |
| 7,290,742 B2* | 11/2007 | Wang | ............... | F16M 13/027 410/151 |
| 7,293,934 B1* | 11/2007 | Huang | ............... | F16B 7/105 403/379.5 |
| 7,552,806 B2* | 6/2009 | Tong | ............... | A47L 9/244 30/296.1 |
| 7,581,288 B2* | 9/2009 | Zhang | ............... | A47L 9/244 403/109.2 |
| 8,007,196 B2* | 8/2011 | Whitling | ............... | F16B 7/105 403/166 |
| 8,162,280 B2* | 4/2012 | Yu | ............... | F16M 11/06 248/292.12 |
| 8,376,646 B2* | 2/2013 | Melino, Sr. | ............... | F16B 7/1454 403/322.4 |
| 8,496,217 B2* | 7/2013 | Cerezo Lotina | ............... | B61D 45/00 248/351 |
| 8,567,005 B2* | 10/2013 | Conrad | ............... | A47L 5/32 15/334 |
| 10,426,287 B1* | 10/2019 | Tsai | ............... | A47H 1/022 |
| 10,844,660 B2* | 11/2020 | Leng | ............... | E06C 1/387 |
| 11,083,258 B2* | 8/2021 | Heim | ............... | F16B 7/105 |
| 11,255,363 B2* | 2/2022 | Tsai | ............... | F16B 7/105 |
| 11,441,589 B1* | 9/2022 | Ravnaas | ............... | F16B 7/1454 |
| 2002/0150439 A1* | 10/2002 | Lemke | ............... | B60P 7/15 410/143 |
| 2004/0033117 A1* | 2/2004 | Brown | ............... | B60P 7/15 410/151 |
| 2004/0101351 A1* | 5/2004 | Pitcher | ............... | F16B 7/1454 403/109.5 |
| 2005/0186023 A1* | 8/2005 | Lee | ............... | F16B 7/105 403/109.1 |
| 2005/0271463 A1* | 12/2005 | Mann | ............... | F16B 37/0842 403/109.1 |
| 2006/0147257 A1* | 7/2006 | Chang | ............... | F16B 7/1445 403/109.3 |
| 2009/0206226 A1* | 8/2009 | Forrest | ............... | A47B 91/02 248/354.6 |
| 2010/0316438 A1* | 12/2010 | Sohn | ............... | A45B 9/00 403/109.1 |
| 2012/0034023 A1* | 2/2012 | Wang | ............... | B60P 7/15 403/109.3 |
| 2012/0107037 A1* | 5/2012 | Huang | ............... | F16B 7/105 403/109.3 |
| 2013/0117926 A1* | 5/2013 | Parker | ............... | A47H 1/022 4/610 |

\* cited by examiner

US 12,398,742 B1

STORAGE POLE FACILITATING TELESCOPIC CONTROL ADJUSTMENT

TECHNICAL FIELD

The present application relates to the technical field of heating wire controller connection devices, and in particular, to an electric blanket plug connector.

BACKGROUND

A storage pole is a common bathing product that is commonly installed in toilets for hanging items such as wash supplies. Currently, the storage pole typically includes connecting seats and a straight pipe made of metal, and the straight pipe is installed between two walls through one or two connecting seats. A purpose is to hang more items such as wash supplies.

Chinese patent document with the authorization publication No. CN203468443U discloses a telescopic storage pole, including a connecting seat provided with an installing through hole and an outer straight pipe, the outer straight pipe penetrating in the installing through hole of the connecting seat in an axially movable mode; the outer straight pipe slidingly sleeving at least one inner straight pipe extending out from one or both ends thereof. After adopting the above structure, the present invention is capable of freely telescoping to adjust an overall length on one hand, and enables the outer straight pipe to be axially movable with respect to the connecting seat, so that the phenomenon that the inner straight pipe cannot extend out from a certain end of the outer straight pipe or cannot extend to an extreme position due to space limitations of a toilet room can be avoided.

When the above storage pole in the prior art is telescopically adjusted, there is a phenomenon that control adjustment is inconvenient, thread slipping offset is prone to occurring, and meanwhile, there is no good supporting and protecting effects. Therefore, there is a need to develop a storage pole facilitating telescopic control adjustment in order to solve the above-mentioned technical problems.

SUMMARY

A purpose of the present invention is to provide a storage pole facilitating telescopic control adjustment in order to solve the problems that when the storage pole in the prior art provided in the above background art is telescopically adjusted, control adjustment is inconvenient, thread slipping offset is prone to occurring, and meanwhile, there is no good supporting and protecting effects.

To achieve the above purpose, the present invention provides the following technical solution: a storage pole facilitating telescopic control adjustment, including a main support pipe fitting, a fixed sleeve being installed at a front end of the main support pipe fitting, a limit adjustment mechanism being installed on a surface of an upper end of the fixed sleeve, a telescopic adjustment pipe being installed inside the main support pipe fitting and the fixed sleeve, the limit adjustment mechanism being used for limiting and locking the telescopic adjustment pipe, a connecting sleeve being installed at a front end of the telescopic adjustment pipe, a supporting clamping block structure being installed inside the connecting sleeve, a front end of the connecting sleeve fixedly sleeving a supporting pipe in a connected mode, a spring assembly being installed inside the supporting pipe, and a protective plug head being installed at a front end of the supporting pipe.

Preferably, a fixed guide rail is installed at an inner lower end of the fixed sleeve, and a fixed sliding groove is provided at a lower end of an outer surface of the telescopic adjustment pipe.

Preferably, the fixed guide rail is correspondingly connected to the fixed sliding groove, and the telescopic adjustment pipe is slidingly adjustable along an inside of the main support pipe fitting.

Preferably, a plurality of limit slot hole structures are provided on a surface of an upper end of the telescopic adjustment pipe.

Preferably, a pressing block is installed at an upper end of the limit adjustment mechanism, and a limiting pin is provided at a lower end of the pressing block.

Preferably, both ends of the pressing block are movably connected with the limit adjustment mechanism through a movable shaft, and the limit adjustment mechanism is internally formed with a notch structure.

Preferably, the limiting pin penetrates through the notch structure to be correspondingly connected with the limit slot hole structures.

Preferably, the spring assembly is used for fixing and supporting the storage pole after being compressed.

Compared with the prior art, the present invention has the following beneficial effects:

(1) according to the present invention, the limit adjustment mechanism facilitating assembling and fixing is installed at the front end of the main support pipe fitting, the limiting pin can be quickly controlled to be separated from the limit slot hole on the surface of the telescopic adjustment pipe by a pressing manner, thereby being capable of freely sliding the telescopic adjustment pipe to quickly adjust a length of the entire storage pole; a sliding groove is provided at the bottom of the telescopic adjustment pipe to be correspondingly connected with a guide rail inside the fixed sleeve, such that the telescopic adjustment pipe is smoother and more safe during sliding adjustment, and the rotational offset phenomenon does not occur; and meanwhile, the limiting pin can be caused to be correspondingly connected with the limit slot hole after the pressing block is released, thereby limiting and locking the adjusted telescopic adjustment pipe, avoiding the thread sliding phenomenon and having the advantages of convenient adjustment control and good stability;

(2) according to the present invention, the spring assembly is installed inside the supporting pipe, when the front end of the supporting pipe is extruded by gravity, the built-in spring assembly cooperates with the supporting clamping block structure, and the top spring assembly plays a role in extension, so that a user can conveniently insert the storage pole between the two walls; and through compression by the spring, good fixing and supporting effects are achieved.

In the figures: 1, main support pipe fitting; 2, limit adjustment mechanism; 3, fixed sleeve; 4, telescopic adjustment pipe; 5, limit slot hole structure; 6, fixed guide rail; 7, fixed sliding groove; 8, pressing block; 9, limiting pin; 10, notch structure; 11, movable shaft; 12, connecting sleeve; 13, supporting pipe; 14, protective plug head; 15, supporting clamping block structure; 16, spring assembly.

DETAILED DESCRIPTION OF THE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention.

Figure 1:
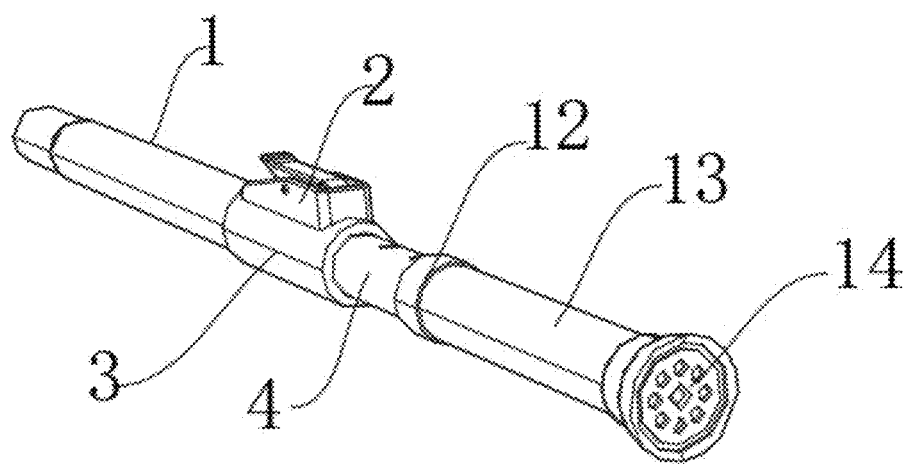
FIG. 1 is a schematic diagram of an overall structure of the present invention.
Figure 2:
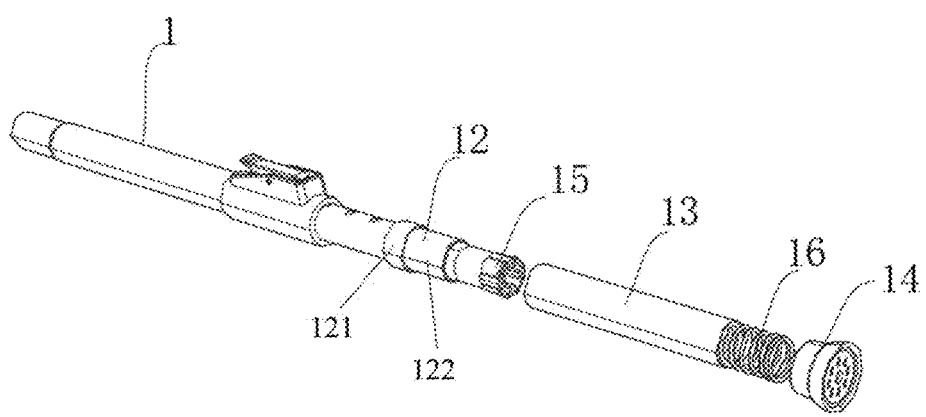
FIG. 2 is an exploded structural schematic diagram of the present invention.
Figure 3:
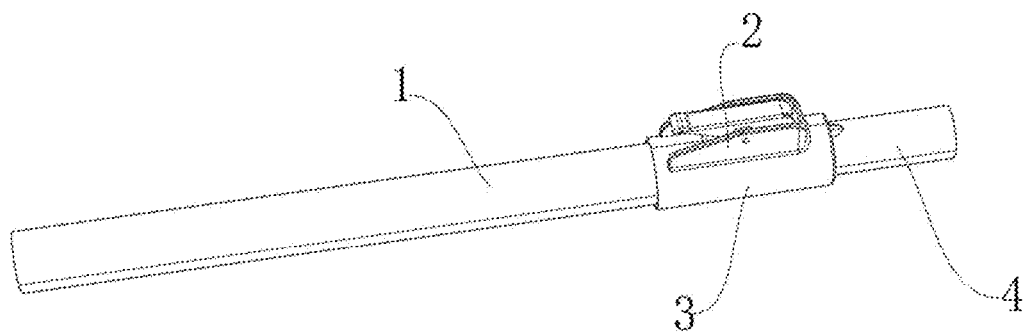
FIG. 3 is a partial installing structural schematic diagram of the present invention.
Figure 4:
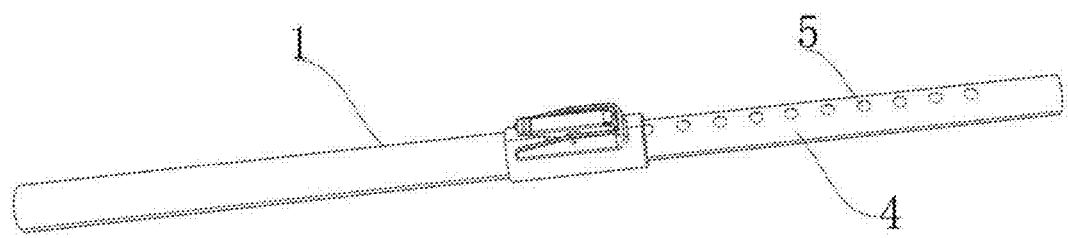
FIG. 4 is a structural schematic diagram after telescopic adjustment of the present invention.
Figure 5:
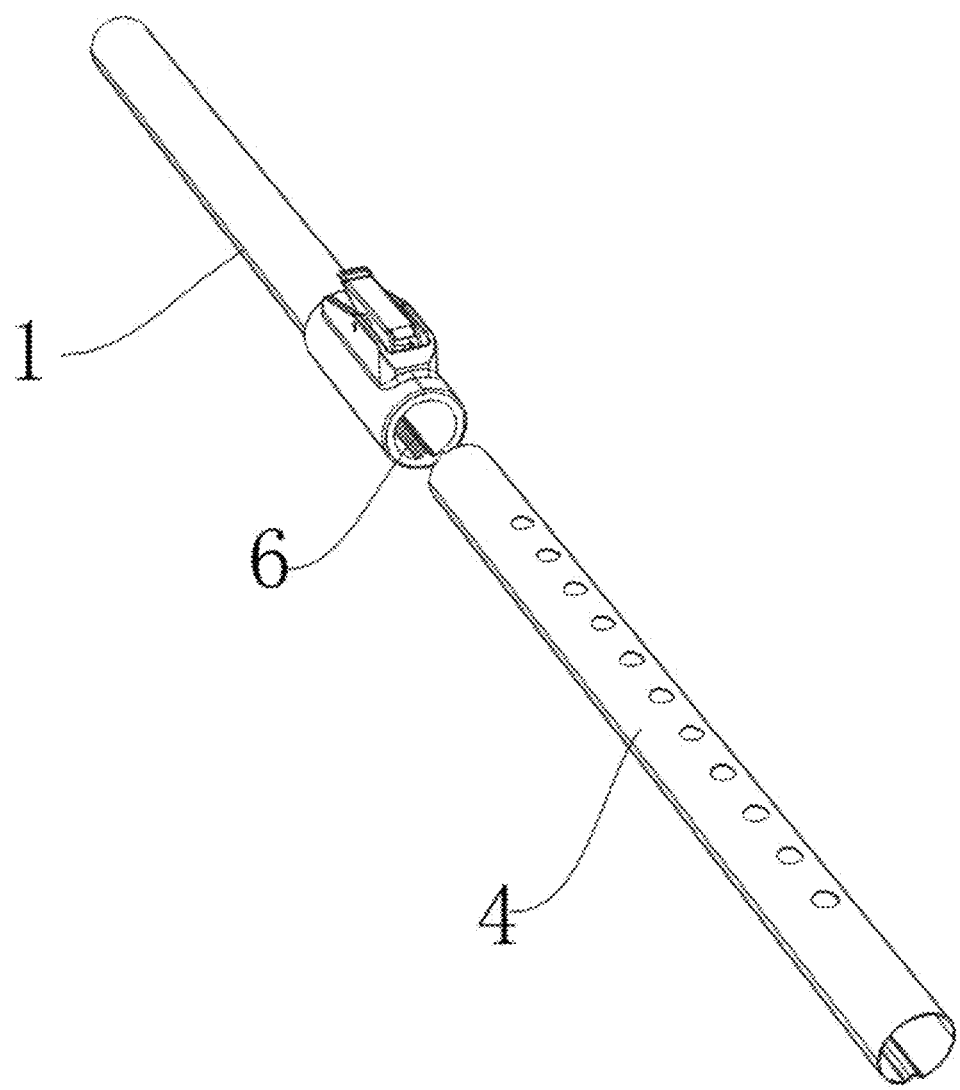
FIG. 5 is a partial exploded structural schematic diagram of the present invention.
Figure 6:
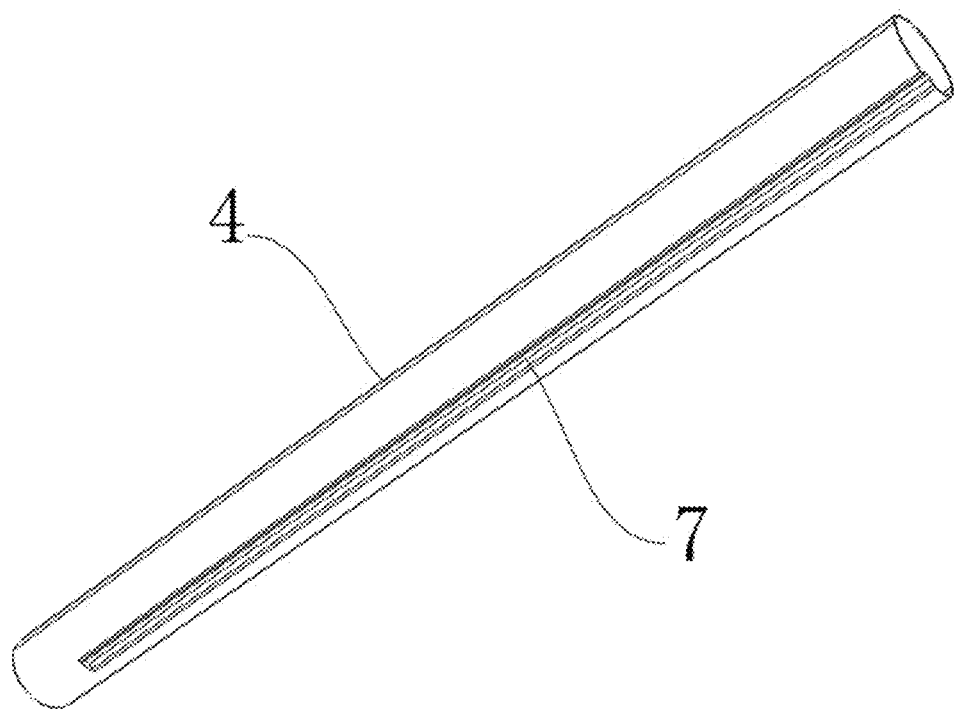
FIG. 6 is a structural schematic diagram of a telescopic adjustment pipe of the present invention.
Figure 7:
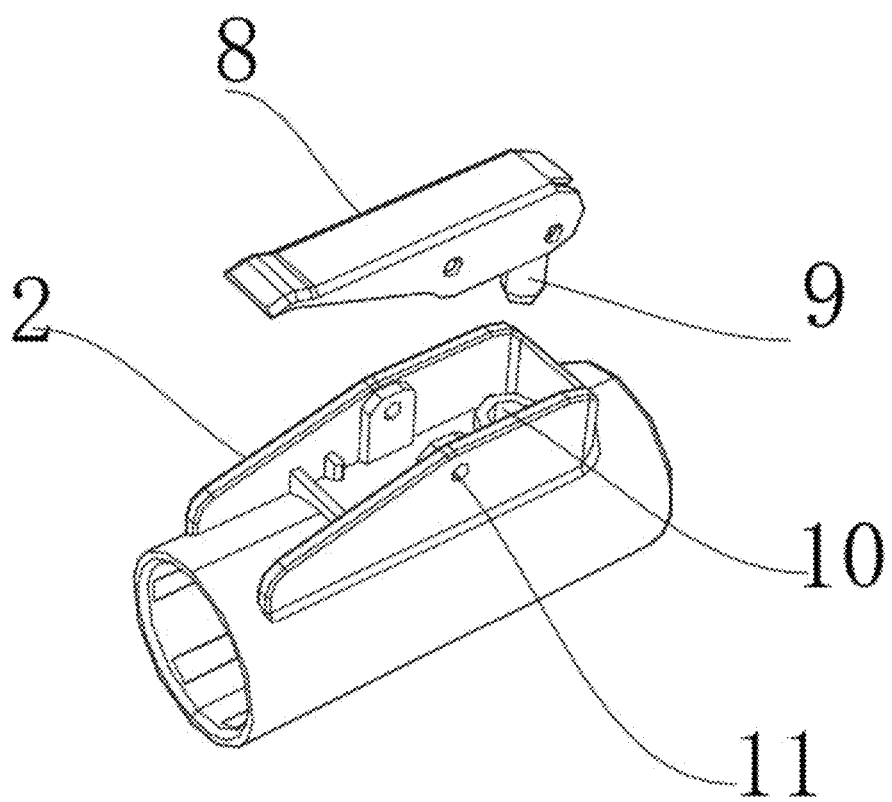
FIG. 7 is a structural schematic diagram of a limit adjustment mechanism of the present invention.
Figure 8:
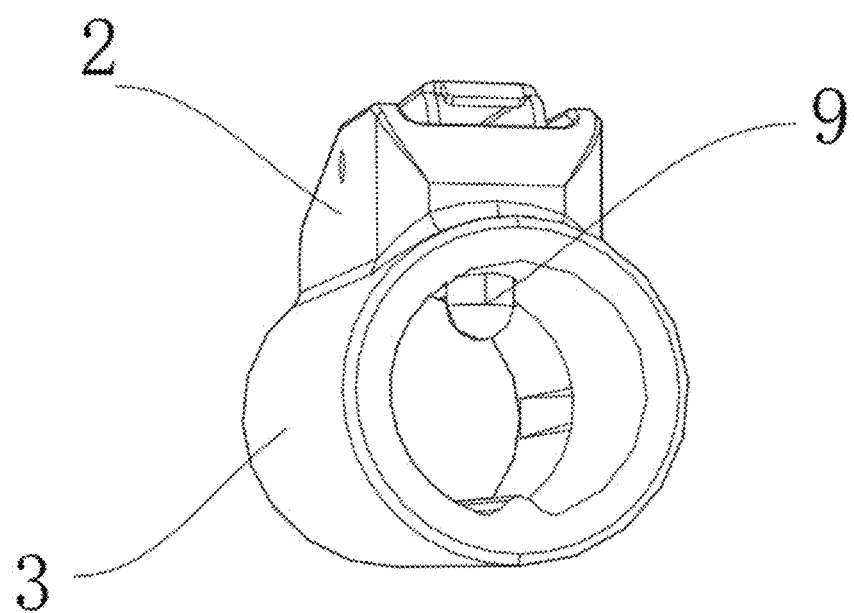
FIG. 8 is a structural schematic diagram of a fixed sleeve of the present invention.

Referring to FIGS. 1-8, according to one embodiment provided by the present invention: a storage pole facilitating telescopic control adjustment, including a main support pipe fitting 1, a fixed sleeve 3 being installed at a front end of the main support pipe fitting 1, a limit adjustment mechanism 2 being installed on a surface of an upper end of the fixed sleeve 3, a telescopic adjustment pipe 4 being installed inside the main support pipe fitting 1 and the fixed sleeve 3, the limit adjustment mechanism 2 being used for limiting and locking the telescopic adjustment pipe 4, a connecting sleeve 12 being installed at a front end of the telescopic adjustment pipe 4, a supporting clamping block structure 15 being installed inside the connecting sleeve 12, a front end of the connecting sleeve 12 fixedly sleeving a supporting pipe 13 in a connected mode, a spring assembly 16 being installed inside the supporting pipe 13, and a protective plug head 14 being installed at a front end of the supporting pipe 13; the connecting sleeve 12 includes a first section 121 proximal to the fixed sleeve 3 and a second section 122 proximal to the supporting pipe 13, an external diameter of the first section 121 is larger than that of the second section 122, and the supporting pipe 13 is sleeved around an outer circumference side of the second section 122; by installing the spring assembly 16 inside the supporting pipe 13, when the front end of the supporting pipe 13 is extruded by gravity, the built-in spring assembly 16 cooperates with the supporting clamping block structure 15, so that good supporting and protecting effects are achieved, and excessive pressure on bottom supporting pipe fittings can be prevented.

Further, a fixed guide rail 6 is installed at an inner lower end of the fixed sleeve 3, a fixed sliding groove 7 is provided at a lower end of an outer surface of the telescopic adjustment pipe 4, the fixed guide rail 6 is correspondingly connected with the fixed sliding groove 7, and the telescopic adjustment pipe 4 is slidingly adjustable along the inside of the main support pipe fitting 1; the fixed guide rail 6 is provided to cooperate with the fixed sliding groove 7, so that the telescopic adjustment pipe 4 can be caused to be smoother and more safe during sliding adjustment without the rotational offset phenomenon.

Further, a plurality of limit slot hole structures 5 are provided on the surface of an upper end of the telescopic adjustment pipe 4 for interfacing with the limiting pin 9 above, thereby limiting and fixing the telescopic adjustment pipe 4.

Further, a pressing block 8 is installed at an upper end of the limit adjustment mechanism 2, a limiting pin 9 is provided at a lower end of the pressing block 8, both ends of the pressing block 8 are movably connected with the limit adjustment mechanism 2 through the movable shaft 11, a notch structure 10 is provided inside the limit adjustment mechanism 2, and the limiting pin 9 penetrates through the notch structure 10 to be correspondingly connected with the limit slot hole structure 5; the limiting pin 9 can be quickly controlled to be separated from the limit slot hole structure 5 on the surface of the telescopic adjustment pipe 4 by pressing the pressing block 8 downwards, thereby being capable of freely sliding the telescopic adjustment pipe 4 to quickly adjust a length of the entire storage pole; meanwhile, the limiting pin 9 can be correspondingly connected with the limit slot hole structure 5 after the pressing block 8 is released, thereby limiting and locking the adjusted telescopic adjustment pipe 4, avoiding the thread sliding phenomenon and having the advantages of convenient adjustment control and good stability.

Further, the spring assembly 16 is used for fixing and supporting the storage pole after being compressed.

Working principle: when in use, a limiting pin 9 can be quickly controlled to be separated from a limit slot hole structure 5 on a surface of the telescopic adjustment pipe 4 by pressing down a pressing block 8, thereby being capable of freely sliding the telescopic adjustment pipe 4 to quickly adjust a length of the entire storage pole;

meanwhile, the limiting pin 9 may be caused to be correspondingly connected with the limit slot hole structure 5 after the pressing block 8 is released, thereby limiting and locking the adjusted telescopic adjustment pipe 4, avoiding the thread sliding phenomenon and having the advantages of convenient adjustment control and good stability; a fixed guide rail 6 is installed at an inner lower end of the fixed sleeve 3, a fixed sliding groove 7 is provided at a lower end of an outer surface of the telescopic adjustment pipe 4, the fixed guide rail 6 is correspondingly connected with the fixed sliding groove 7, and the telescopic adjustment pipe 4 is slidingly adjustable along the inside of the main support pipe fitting 1; by providing the fixed guide rail 6 in cooperation with the fixed sliding groove 7, the telescopic adjustment pipe 4 can be caused to be smoother and more safe during sliding adjustment, and the rotational offset phenomenon does not occur; a connecting sleeve 12 is installed at a front end of the telescopic adjustment pipe 4, a supporting clamping block structure 15 is installed inside the connecting sleeve 12, a front end of the connecting sleeve 12 fixedly sleeving a supporting pipe 13 in a connected mode, a spring assembly 16 is installed inside the supporting pipe 13, and a protective plug head 14 is installed at a front end of the supporting pipe 13; by installing the spring assembly 16 inside the supporting pipe 13, the built-in spring assembly 16 cooperates with the supporting clamping block structure 15, and the top spring assembly 16 plays a role in extension, so that a user can conveniently insert the storage pole between the two walls; and through compression by the spring, good fixing and supporting effects are achieved.

It should be noted that relational terms such as first and second are used herein merely to distinguish one entity or operation from another entity or operation and do not necessarily require or imply the existence of any such actual relationship or sequence between these entities or operations. Moreover, the terms "include", "comprise", or any other variants thereof are intended to cover non-exclusive inclusion, so that a process, method, item, or device including a series of elements includes not only those elements but also other elements not explicitly listed, or further includes inherent elements of such process, method, item, or device.

The standard parts used in the application document can be purchased from the market. The specific connection manner of each part is connection with a mature conventional means in the prior art, such as bolts, rivets, welding and the like, machines, and parts and equipment are all conventional models in the prior art. In addition, a circuit connection adopts a conventional connection manner in the prior art, and details are not described herein again.

Although the embodiments of the present invention have been shown and described, it will be appreciated by those of ordinary skill in the art that various changes, modifications, substitutions, and variations can be made to these embodiments without departing from the principle and spirit of the present invention, and the scope of the present invention is defined by the appended claims and their equivalents.

What is claimed is:

1. A storage pole facilitating telescopic control adjustment, comprising a main support pipe fitting (1), characterized in that a fixed sleeve (3) is installed at a front end of the main support pipe fitting (1), a limit adjustment mechanism (2) is installed on a surface of an upper end of the fixed sleeve (3), a telescopic adjustment pipe (4) is installed inside the main support pipe fitting (1) and the fixed sleeve (3), the limit adjustment mechanism (2) is used for limiting and locking the telescopic adjustment pipe (4), a connecting sleeve (12) is installed at a front end of the telescopic adjustment pipe (4), a supporting clamping block structure (15) is installed inside the connecting sleeve (12), a front end of the connecting sleeve (12) fixedly sleeves a supporting pipe (13) in a connected mode, a spring assembly (16) is installed inside the supporting pipe (13), and a protective plug head (14) is installed at a front end of the supporting pipe (13); the supporting clamping block structure (15) is located at a rear end of the spring assembly (16) distal to the protective plug head (14), when a front end of the supporting pipe (13) is extruded, the spring assembly (16) cooperates with the supporting clamping block structure (15), so that good supporting and protecting effects are achieved, and excessive pressure on bottom supporting pipe fittings can be prevented.

2. The storage pole facilitating telescopic control adjustment according to claim 1, characterized in that a fixed guide rail (6) is installed at an inner lower end of the fixed sleeve (3), and a fixed sliding groove (7) is provided at a lower end of an outer surface of the telescopic adjustment pipe (4).

3. The storage pole facilitating telescopic control adjustment according to claim 2, characterized in that the fixed guide rail (6) is correspondingly connected with the fixed sliding groove (7), and the telescopic adjustment pipe (4) is slidingly adjustable along an inside of the main support pipe fitting (1).

4. The storage pole facilitating telescopic control adjustment according to claim 1, characterized in that a plurality of limit slot hole structures (5) are provided on a surface of an upper end of the telescopic adjustment pipe (4).

5. The storage pole facilitating telescopic control adjustment according to claim 1, characterized in that a pressing block (8) is installed at an upper end of the limit adjustment mechanism (2), and a limiting pin (9) is provided at a lower end of the pressing block (8).

6. The storage pole facilitating telescopic control adjustment according to claim 5, characterized in that both ends of the pressing block (8) are movably connected with the limit adjustment mechanism (2) through a movable shaft (11), and a notch structure (10) is provided inside the limit adjustment mechanism (2).

7. The storage pole facilitating telescopic control adjustment according to claim 6, characterized in that the limiting pin (9) penetrates through the notch structure (10) to be correspondingly connected with the limit slot hole structures (5).

8. The storage pole for facilitating telescopic control adjustment according to claim 1, characterized in that the spring assembly (16) is used for fixing and supporting the storage pole after being compressed.

9. The storage pole for facilitating telescopic control adjustment according to claim 1, characterized in that the connecting sleeve (12) comprises a first section (121) proximal to the fixed sleeve (3) and a second section (122) proximal to the supporting pipe (13), an external diameter of the first section (121) is larger than that of the second section (122), and the supporting pipe (13) is sleeved around an outer circumference side of the second section (122).

* * * * *